United States Patent
Kuze et al.

(10) Patent No.: US 7,080,609 B2
(45) Date of Patent: Jul. 25, 2006

(54) ENGINE SYSTEM WITH A THERMAL STORAGE DEVICE, AND ENGINE TEMPERATURE RAISING METHOD

(75) Inventors: Yasuhiro Kuze, Susono (JP); Takayuki Otsuka, Susono (JP); Hiroki Ichinose, Fujinomiya (JP); Yukio Kinugasa, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 20 days.

(21) Appl. No.: 10/891,077

(22) Filed: Jul. 15, 2004

(65) Prior Publication Data

US 2005/0022769 A1   Feb. 3, 2005

(30) Foreign Application Priority Data

Jul. 28, 2003   (JP) .............................. 2003-280989

(51) Int. Cl.
  *F03P 3/20*   (2006.01)
  *F03P 7/16*   (2006.01)
  *F02N 17/06*  (2006.01)

(52) U.S. Cl. .................................... 123/41.14

(58) Field of Classification Search ............. 123/41.14, 123/41.01, 41.05
See application file for complete search history.

(56) References Cited

U.S. PATENT DOCUMENTS

| | | | | |
|---|---|---|---|---|
| 5,662,072 A  * | 9/1997 | Suzuki et al. ............. | 123/41.14 |
| 5,765,511 A  * | 6/1998 | Schatz ....................... | 123/41.14 |
| 6,532,911 B1 * | 3/2003 | Suzuki et al. ............. | 123/41.14 |
| 6,615,772 B1 * | 9/2003 | Ichinose et al. .......... | 123/41.14 |
| 6,629,512 B1 * | 10/2003 | Iwatani et al. ........... | 123/41.14 |
| 6,681,725 B1 * | 1/2004 | Kobayashi et al. ....... | 123/41.14 |
| 6,810,977 B1 * | 11/2004 | Suzuki ....................... | 180/65.2 |
| 6,895,904 B1 * | 5/2005 | Kobayashi et al. ....... | 123/41.14 |
| 6,915,763 B1 * | 7/2005 | Arisawa et al. .......... | 123/41.14 |

FOREIGN PATENT DOCUMENTS

| | | |
|---|---|---|
| JP | 2002-122061 | 4/2002 |
| JP | 2003-049692 | 2/2003 |

* cited by examiner

*Primary Examiner*—Henry C. Yuen
*Assistant Examiner*—Jason Benton
(74) *Attorney, Agent, or Firm*—Oliff & Berridge, PLC

(57) ABSTRACT

An engine system with a thermal storage device is capable of efficiently supplying heat from a thermal storage device to an internal combustion engine. The engine system equipped with the thermal storage tank supplies the hot water stored in the thermal storage tank to a cylinder head of the internal combustion engine before the starting thereof. At this time, an electronic control unit sets a target value of the temperature of the internal combustion engine at the start of the hot water supply in such a manner that the lower the temperature of the internal combustion engine, the lower the target value becomes. As a result, a variation in combustion states between cylinders can be suppressed at the starting of the internal combustion engine.

14 Claims, 8 Drawing Sheets

Fig. 3A  ABSENCE OF EXCHANGE OF COOLING WATER BETWEEN
INTERNAL COMBUSTION ENGINE AND THERMAL STORAGE TANK
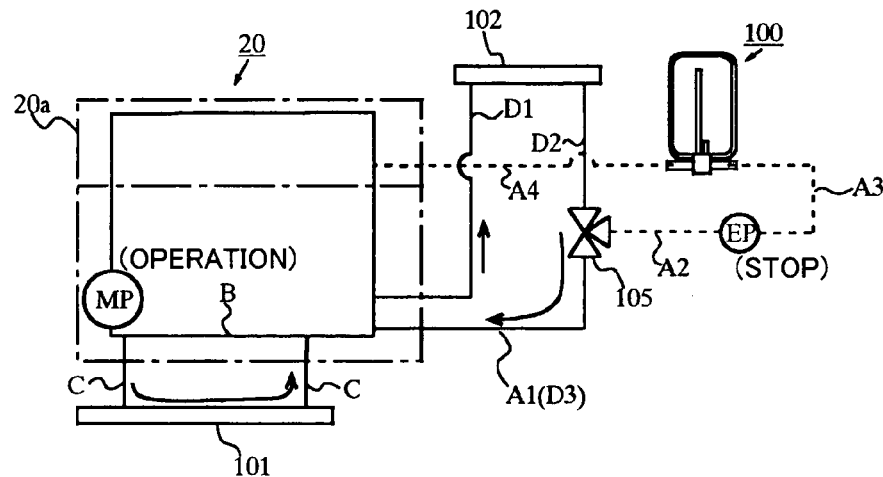
Fig. 3B  RECOVERY OF HOT WATER FROM INTERNAL COMBUSION ENGINE
INTO THERMAL STORAGE TANK
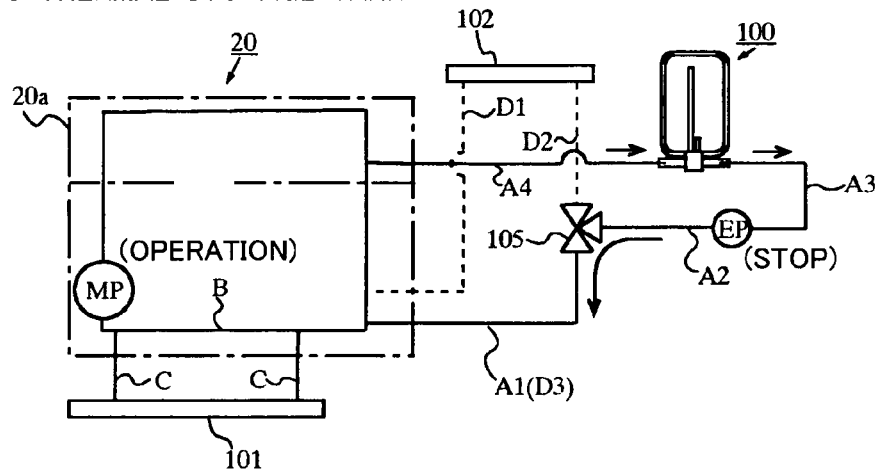
Fig. 3C  SUPPLY OF HOT WATER FROM INTERNAL COMBUSTION ENGINE
INTO THERMAL STORAGE TANK
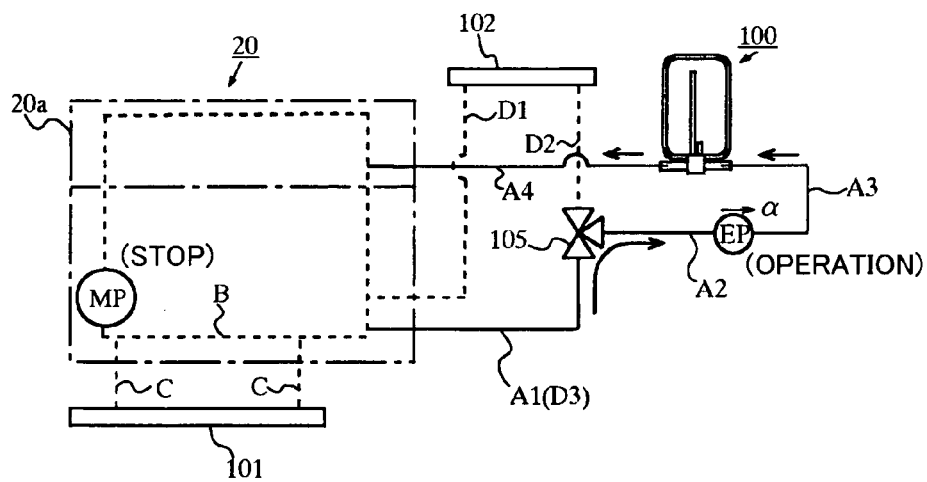

ENGINE SYSTEM WITH A THERMAL STORAGE DEVICE, AND ENGINE TEMPERATURE RAISING METHOD

BACKGROUND OF THE INVENTION

1. Field of the Invention

The present invention relates to an engine system equipped with an internal combustion engine as a drive source, and in particular, to such an engine system equipped with a thermal storage device that supplies the heat stored in itself to the internal combustion engine.

2. Description of the Related Art

There has hitherto been known an engine system having an internal combustion engine as a drive source, and a thermal storage device (thermal storage tank) that serves to accumulate or store cooling water heated by the internal combustion engine during operation thereof in a heat retaining state so as to utilize it for facilitating the subsequent warm-up of the internal combustion engine. In an engine system described in a first patent document (Japanese patent application laid-open No. 2002-122061) for example, the cooling water (hot water) accumulated or stored in a thermal storage tank is supplied to the internal combustion engine when the temperature of the cooling water falls below a predetermined value during engine starting, so that the driveability and the exhaust characteristics of the internal combustion engine at the time of engine starting can be improved by such supply of hot water.

However, the hot water supplied from the thermal storage tank flows into a cooling system of the internal combustion engine through a prescribed passage or path, thus heating intake port inner walls of a cylinder head. Here, though the temperature of the internal combustion engine is gradually raised by the hot water being supplied to the cooling system, the mode or manner of the temperature rise varies depending upon the various parts of the internal combustion engine.

For example, in the cylinder head of an in-line four-cylinder internal combustion engine, when hot water is made to flow into a water jacket in the cylinder head from one end of a cylinder row to the other end thereof, the rise speed of the temperature is the fastest at a cylinder (intake port) closest to a hot water incoming location and is the slowest at a cylinder (intake port) farthest to that location. In other words, there arises a variation in the temperatures of a plurality of intake ports as a result of the hot water supply. This temperature variation, resulting from a difference between the temperature rise speeds of the respective intake ports, becomes greater in accordance with the increasing operation time (duration time) of the hot water supply.

Such a temperature variation generated between the plurality of intake ports invites a variation in the combustion states between the plurality of cylinders, thus giving rise to a fear that the driveability and exhaust characteristics of the entire engine system might be deteriorated.

SUMMARY OF THE INVENTION

The present invention has been made in view of the above-mentioned circumstances, and has for its object to provide an engine system with a thermal storage device and an engine temperature raising method which are capable of supplying heat from the thermal storage device to an internal combustion engine in an efficient manner.

In order to achieve the above object, the present invention can be constructed as stated below.

(1) According to one aspect of the present invention, there is provided an engine system which is equipped with an internal combustion engine and a thermal storage device for storing heat, and which serves to supply the heat stored in the thermal storage device to the internal combustion engine through a prescribed thermal medium so as to raise the temperature of the internal combustion engine to a prescribed target value, the engine system comprising: a temperature information acquisition device that acquires information on the temperature of the internal combustion engine at the time of the heat supply; and a target value setting device that sets the target value based on the acquired information in such a manner that the lower the temperature of the internal combustion engine, the smaller does the target value become.

According to this arrangement, by setting the target value of the temperature of the internal combustion engine such that the lower the temperature of the internal combustion engine at the time of the heat supply, the smaller does the target value become, it is possible to prevent positive effects of the hot water supply, such as one represented by facilitated vaporization of the fuel supplied to the internal combustion engine, from being substantially reduced by negative effects of the hot water supply, such as one represented by an increase in the power consumption of an electric pump. In addition, the heat supply is stopped before the progress of a nonuniform temperature distribution in the interior of the internal combustion engine in accordance with the hot water supply (i.e., before a variation in the temperature distribution becomes greater than a certain extent). As a result, trouble resulting from the variation in the temperature distribution in the interior of the internal combustion engine can be eliminated. Thus, for example, it is possible to suppress reduction in the stability of the combustion state of the engine combustion state, especially a variation in combustion states caused between a plurality of cylinders in a multi-cylinder internal combustion engine.

Here, note that the term "at the time of the heat supply" means a period of time before and after a time point at which the supply of heat is started, i.e., a time duration with a certain length.

(2) Preferably, when the temperature of the internal combustion engine at the time of the heat supply is below a predetermined value, the target value setting device sets the target temperature in such a manner that the lower the temperature of the internal combustion engine, the smaller does the target value become.

There exists a target value or an upper limit value for the target value at which the supply of hot water can be performed most efficiently in consideration of the easiness in vaporization of the fuel supplied to the internal combustion engine, the amount of consumption of the energy used for the hot water supply, and the amount of heat being able to be supplied. Accordingly, by adopting such an arrangement, when the temperature of the internal combustion engine at the time of the heat supply is below a predetermined value, the target value may be set in such a manner that the lower the temperature of the internal combustion engine, the smaller does the target value become, whereas when the temperature of the internal combustion engine at the time of the heat supply is above or equal to the predetermined value, the target value may not be changed for example. As a result, the supply of hot water can be efficiently carried out in consideration of the amount of consumption of the energy used for the hot water supply and the amount of heat being able to be supplied.

(3) According to another aspect of the present invention, there is provided an engine system with a thermal storage device which is equipped with an internal combustion engine and the thermal storage device for storing heat, and which serves to supply the heat stored in the thermal storage device to the internal combustion engine through a prescribed thermal medium thereby to perform engine warm-up processing, the engine system comprising: a temperature information acquisition device that acquires information on the temperature of the internal combustion engine at the time of the heat supply; and a heat supply amount setting device that sets an amount of heat supplied to the internal combustion engine based on the acquired information in such a manner that the lower the temperature of the internal combustion engine, the smaller does the amount of heat supplied to the internal combustion engine become.

Here, it is to be noted that a variety of concrete methods can be considered as the method of setting the amount of heat to be supplied. For example, the amount of heat to be supplied can be set by setting the amount of the thermal medium to be supplied, the supply time or duration of the thermal medium, the supply speed of the thermal medium, the target value of the temperature of the internal combustion engine receiving the heat supply, etc.

According to this arrangement, by setting the amount of heat supplied to the internal combustion engine in such a manner that the lower the temperature of the internal combustion engine at the time of engine starting, the smaller does the amount of heat supplied to the internal combustion engine become, the heat supply is stopped before the progress of a nonuniform temperature distribution in the interior of the internal combustion engine in accordance with the supply of hot water through the thermal medium (i.e., before a variation in the temperature distribution becomes greater than a certain extent). As a result, trouble resulting from the variation in the temperature distribution in the interior of the internal combustion engine can be eliminated. Accordingly, for example, it is possible to suppress reduction in the stability of the combustion state of the engine combustion state, especially a variation in combustion states caused between a plurality of cylinders in a multi-cylinder internal combustion engine.

(4) Preferably, the engine system performs the supply of heat to the internal combustion engine so as to make the temperature of the internal combustion engine become a prescribed target value, and the heat supply amount setting device sets a time for which the supply of heat is performed in such a manner that the lower the temperature of the internal combustion engine, the shorter does the time become.

With such an arrangement, too, the heat supply is stopped before the progress of a nonuniform temperature distribution in the interior of the internal combustion engine in accordance with the supply of hot water through the thermal medium (i.e., before a variation in the temperature distribution becomes greater than a certain extent). As a result, trouble resulting from the variation in the temperature distribution in the interior of the internal combustion engine can be eliminated. Accordingly, for example, it is possible to suppress reduction in the stability of the combustion state of the engine combustion state, especially a variation in combustion states caused between a plurality of cylinders in a multi-cylinder internal combustion engine.

(5) Preferably, when the temperature of the internal combustion engine at the time of the heat supply is below a predetermined value, the heat supply amount setting device sets the amount of heat supplied to the internal combustion engine in such a manner that the lower the temperature of the internal combustion engine, the smaller does the amount of heat supplied to the internal combustion engine become.

(6) Preferably, the information acquired by the temperature information acquisition device at the time of the heat supply contains at least one of the temperature of an outside air and the temperature of engine cooling water.

(7) Preferably, the temperature of the internal combustion engine is decided by at least one of the temperature of engine cooling water, the temperature of an intake port inner wall, and the temperature of a cylinder inner wall that constitutes the internal combustion engine.

(8) According to a further aspect of the present invention, there is provided an engine temperature raising method comprising: a first step of acquiring information on the temperature of an internal combustion engine at the time when heat is supplied from a thermal storage device to the internal combustion engine, and setting a target value of the temperature of the internal combustion engine such that the lower the temperature of the internal combustion engine obtained from the acquired information, the smaller does the target value of the temperature of the internal combustion engine become; and a second step of supplying the heat stored in the thermal storage device to the internal combustion engine through a prescribed thermal medium so as to raise the temperature of the internal combustion engine to the target value.

According to an engine system of the present invention, it is possible to obtain positive effects due to the supply of heat from a heat storage device to an internal combustion engine, such as for example one represented by the facilitation of vaporization of the fuel supplied to the internal combustion engine.

The above and other objects, features and advantages of the present invention will become more readily apparent to those skilled in the art from the following detailed description of a preferred embodiment of the present invention taken in conjunction with the accompanying drawings.

BRIEF DESCRIPTION OF THE DRAWINGS

FIGS. 3A through 3C are schematic views showing flow path arrangements for cooling water in the cooling system of the internal combustion engine according to this embodiment.

DESCRIPTION OF THE PREFERRED EMBODIMENTS

Hereinafter, reference will be made to a preferred embodiment of the present invention in which the present invention is applied to a vehicle-mounted hybrid engine system.

[Basic Construction of the Engine System]

Figure 1:
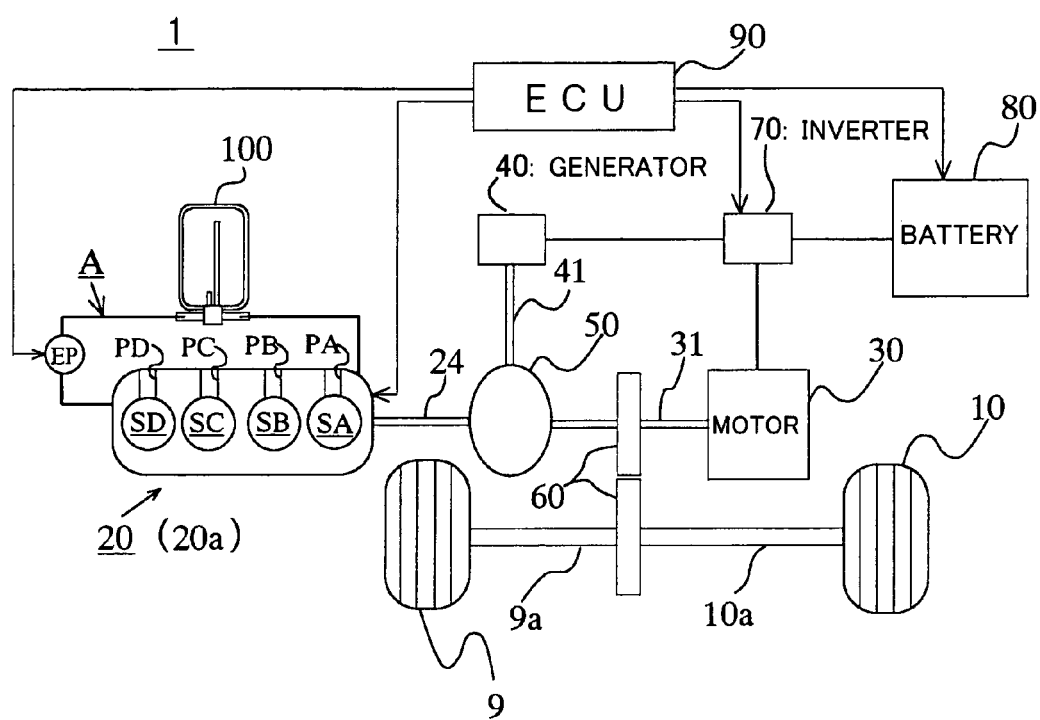
FIG. 1 is a schematic constructional view showing an engine system according to one embodiment of the present invention.
Figure 9:
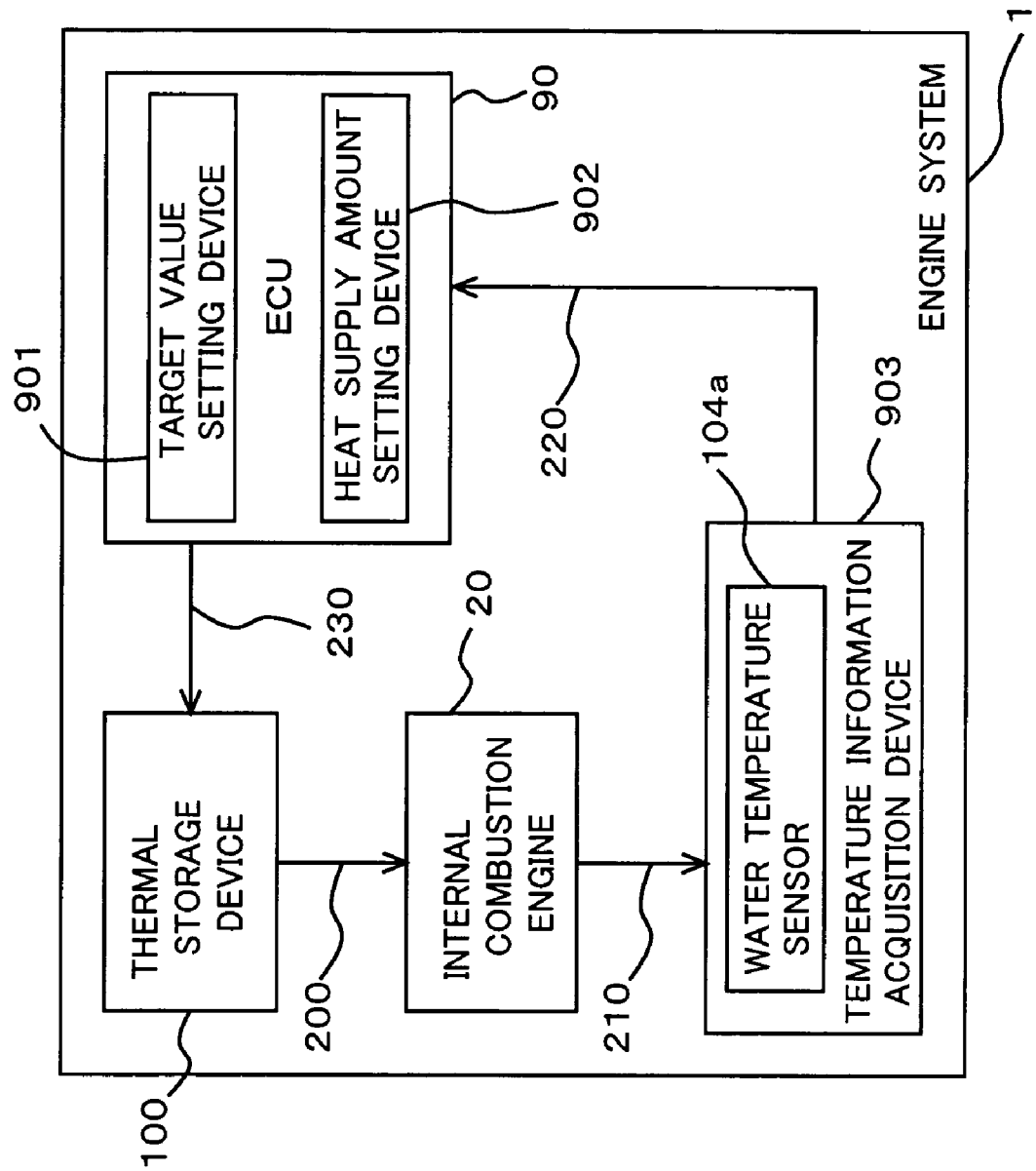
FIG. 9 is a block diagram showing the relation between component parts of this embodiment.

As shown in FIG. 1, a hybrid engine system (hereinafter referred to simply as an engine system), generally designated at reference numeral 1, includes, as its main component elements, an internal combustion engine 20, a motor 30 (part of a motor generator), a generator 40 (part of the motor generator), a power dividing mechanism 50, a speed reducer 60, an inverter 70, a battery 80, an electronic control unit (ECU) 90, a thermal storage tank 100, etc. Here, note that FIG. 9 is a block diagram that shows the relation between such component parts in this embodiment.

The internal combustion engine 20 has four cylinders SA, SB, SC, SD arranged serially in a single line. In a cylinder head 20a of the internal combustion engine 20, there are formed a plurality of air passages in the form of four intake ports PA, PB, PC, PD for introducing air into combustion chambers of the respective cylinders SA, SB, SC, SD. In the intake ports PA, PB, PC, PD, there are arranged a plurality of (four, in this example) fuel injection valves (not shown) for supplying through injection an appropriate amount of fuel into the corresponding intake ports based on instruction or command signals from the ECU 90. The internal combustion engine 20 serves not only to provide a rotational force to driving wheels 9, 10 of a vehicle (movable object) on which the engine system 1 is installed, but also to drive the generator 40 for generation of electric power. The generator 40, in one case, is driven to generate electric power by the internal combustion engine 20, and in another case, is supplied with electric power from the inverter 70 to provide a rotational force to the internal combustion engine 20. Also, the motor 30, in one case, is supplied with electricity by the generator 40 to provide a rotational force to the driving wheels 9, 10, and in another case, is given a rotational force by the driving wheels 9, 10 or the internal combustion engine 20 to generate electric power which is supplied to the battery 80 for charging thereof. The motor 30 has its rotation shaft 31 operatively connected with the rotation shafts or axles 9a, 10a of the driving wheels 9, 10 through the speed reducer 60.

In addition, the crankshaft 24 of the internal combustion engine 20 and the rotation shaft 31 of the motor 30 are operatively and mutually connected with the rotation shaft 41 of the generator 40 through the power dividing mechanism 50 with a well-known built-in planetary gear (not shown). The planetary gear has three mutually geared rotation shafts, which are operatively coupled with the crankshaft 24, the rotation shaft 31 of the motor 30 and the rotation shaft 41 of the generator 40, respectively. The planetary gear has a characteristic that when the rotational speeds (the number of revolutions per minute) and the torques of any two of its component elements, three rotation shafts, are decided, those of the remaining one is inevitably decided. In the engine system 1, by making use of such a characteristic of the power dividing mechanism 50, it is possible to transmit the power or driving force (i.e., the rotational force of the crankshaft 24) generated by the internal combustion engine 20 for example to the rotation shaft 31 of the motor 30 and the rotation shaft 41 of the generator 40 in a divided manner. Moreover, by utilizing the power generated by the motor 30 and the power generated by the internal combustion engine 20 in combination, it is possible to mainly drive the axles 9a, 10a of the driving wheels 9, 10 and at the same time to drive the generator 40 by means of the remaining driving power thereby to charge the battery 80. Further, in the case of the vehicle being at a standstill for example, by supplying electric power to the generator 40 to drive it with the motor 30 stopped, the crankshaft 24 of the internal combustion engine 20, being in a non-combustion state, can be driven to rotate, whereby combustion of the engine is started. Also, by supplying electric power to both the motor 30 and the generator 40 to drive them in a motor-driving mode, it is possible to cause the crankshaft 24 of the internal combustion engine 20 in its non-combustion state to rotate, thereby making it possible for the engine to start combustion.

Further, the engine system 1 includes various kinds of sensors (not shown) for generating signals in response to the operating states of the internal combustion engine 20, the motor 30, the battery 80, etc., all of which are electrically connected to the ECU 90.

The ECU 90 is provided with a central processing unit (CPU), a read only memory (ROM), a random-access memory (RAM), a backup RAM, a timer counter, etc., all of which are electrically connected to an external input circuit including an A/D converter and an external output circuit through bilateral buses to form an arithmetic logic circuit. The ECU 90 receives the signals output from the various kinds of sensors (not shown) through the external input circuit, and grasps or recognizes the operating states of the internal combustion engine 20, the motor 30, the battery 80, etc., based on these signals so that it performs various kinds of control so as to optimize the operating condition of the engine system 1 based on the operating states of these elements 20, 30, 80, etc.

[Schematic Construction of the Cooling System]

The engine system 1 is provided with a thermal storage system that serves to temporarily accumulate or store part of the heat generated in accordance with the operation of the internal combustion engine 20 (stated accurately, part of a heated thermal medium in the form of cooling water), and utilize it to warm up the internal combustion engine 20 as required. The thermal storage system is constructed such that it includes, in addition to the thermal storage tank 100 (thermal storage device) arranged on a passage or path that circulates cooling water, various passage members, an electric water pump EP, etc., which serve to exchange the heat of the cooling water between a cooling water circulation system formed in the internal combustion engine 20 and the thermal storage tank 100.

Figure 2:
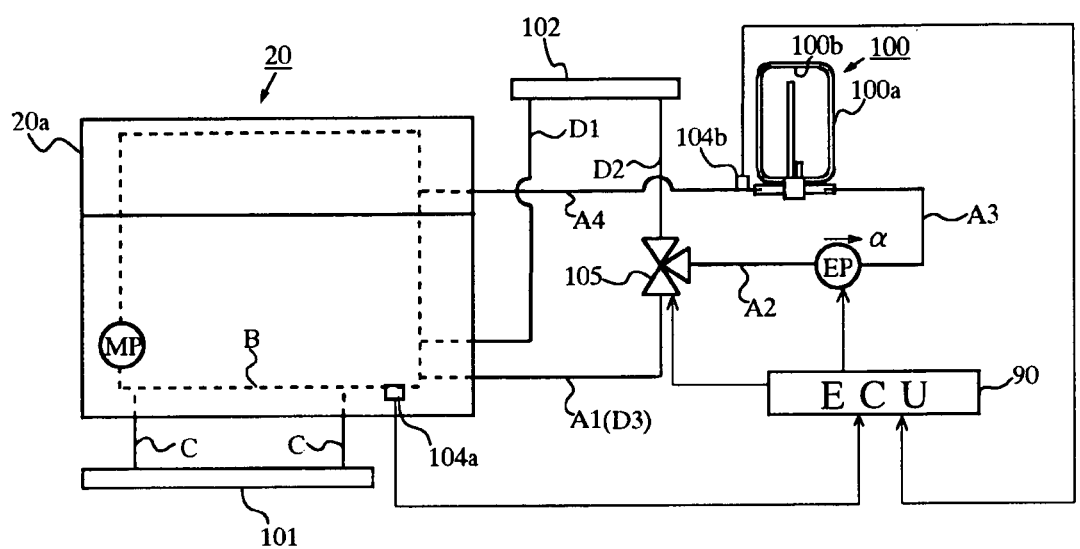
FIG. 2 is a constructional view schematically showing a cooling system of an internal combustion engine according to this embodiment.

FIG. 2 is a constructional view that schematically shows the cooling system of the internal combustion engine 20 including the thermal storage tank 100 according to this embodiment. The cooling system comprises a first circulation passage A including passage members (A1, A2, A3, A4) for circulating cooling water between the internal combustion engine 20 and the thermal storage tank 100, a second circulation passage (water jacket) B formed to surround the respective combustion chambers and exhaust ports in the interior of the internal combustion engine 20, a third circulation passage C for circulating cooling water between the internal combustion engine 20 and a radiator 101, a fourth circulation passage D including passage members (D1, D2, D3) for circulating cooling water between the internal combustion engine 20 and a heater core 102, etc. Here, note that the passage members A1, D3 are common for the first and fourth circulation passages A, D, and constitute part of these passages. Thus, the cooling system is a composite system constructed by combining the plurality of cooling water circulation passages, and the cooling water circulating in this cooling system serves to cool or heat the various parts of the internal combustion engine 20.

A variety of kinds of members for controlling or detecting the behavior and temperature of the cooling water are installed on the circulation passages A, B, C, D that constitute the cooling system. The electric water pump (electric pump) EP is operated based on instruction or command signals from the ECU 90 to cause the cooling water in the circulation passage A to flow in a direction of arrow α. The thermal storage tank 100 is arranged in the vicinity of the electric pump EP on the first circulation passage A, and has a function to store or accumulate a predetermined amount of cooling water in a state thermally insulated from the outside. That is, the thermal storage tank 100 is of a double structure having a housing 100a and a cooling water receiving part 100b received in the housing 100a. A clearance or gap between the housing 100a and the cooling water receiving part 100b is kept substantially in a vacuum state, so that the internal space of the cooling water receiving part 100b can be held in a state thermally insulated from the outside. The cooling water (hot water) discharged from the thermal storage tank 100 into the passage member A4 is introduced into the cylinder head 20a of the internal combustion engine 20 (see line 200 in FIG. 9) to preferentially flow in a path formed in the neighborhood of the intake port of each cylinder in the cylinder head 20a. A mechanically operated water pump (mechanical pump) MP utilizes the driving force transmitted thereto from the output shaft of the internal combustion engine 20 to circulate the cooling water in the second circulation passage B. The radiator 101 arranged on the third circulation passage C serves to let the heat of the heated cooling water escape to the outside (i.e., facilitate the dissipation of heat from the cooling water). A heater core 102 for heating arranged on the fourth circulation passage D serves to warm the interior of a passenger compartment (not shown) of the vehicle as required by making use of the heat of the cooling water heated in the internal combustion engine 20. A first water temperature sensor 104a arranged on the second circulation passage B in the interior of the internal combustion engine 20 detects the temperature of the cooling water (cooling water temperature) in the second circulation passage B to generate a corresponding detection signal (see line 210 in FIG. 9) to the ECU 90 (see line 220 in FIG. 9). In addition, a second water temperature sensor 104b arranged in the vicinity of the thermal storage tank 100 on the first circulation passage A detects the temperature of the cooling water (cooling water temperature) in the first circulation passage A and outputs a corresponding detection signal to the ECU 90. The passage member A2 constituting a part of the first circulation passage A, the passage member D2 constituting a part of the forth circulation passage D, and the common passage A1(D3) are connected with one another by means of a three-way valve 105, which is a well-known control valve that is electromagnetically driven to operate based on a command signal from the ECU 90.

[Switching between the Flow Passages in the Cooling System]

The ECU 90 controls to switch between the cooling water flow passages formed in the cooling system according to the operating condition of the engine system 1 and an external situation. For example, when the internal combustion engine 20 is in the ordinary operating condition (ordinary combustion state), cooling water is controlled to circulate through the second circulation passage B (internal combustion engine 20), the third circulation passage C (radiator 101) and the fourth circulation passage D (heater core 102) thereby to cool the internal combustion engine 20 and to heat the passenger compartment (not shown). On the other hand, when a prescribed condition, including that the temperature of the internal combustion engine 20 is below a predetermined value, holds, the hot water reserved or stored in the thermal storage tank 100 is supplied to the internal combustion engine 20 through the first circulation passage A before the starting of the internal combustion engine 20 (i.e., the warm-up processing of the internal combustion engine 20 is performed).

FIGS. 3A through 3C are schematic views illustrating flow paths for the cooling water in the cooling system of the internal combustion engine 20 according to this embodiment. The flow path or channel of the cooling water in the cooling system is switched in the following manner in accordance with the operating condition of the internal combustion engine 20, the operating state of the electric pump EP, and the state of the three-way valve 105.

The flow path or channel shown in FIG. 3A is one example of a flow path that is formed during the operation of the internal combustion engine 20. This flow path is formed when an open end of the passage member A2 is closed and at the same time the passage members D2, D3(A1) are placed in communication with each other under the control function of the three-way valve 105, and when the mechanical pump MP (internal combustion engine 20) is in operation and at the same time the electric pump EP is out of operation. In this case, cooling water circulates in the second circulation passage B (internal combustion engine 20), and in addition, cooling water circulates in the third circulation passage C (radiator 101) under the control function of a well-known thermostat (not illustrated) arranged on the second circulation passage B. Also, cooling water circulates in the fourth circulation passage D (heater core 102).

The flow path or channel shown in FIG. 3B is another example of a flow path which is formed during the operation of the internal combustion engine 20. This flow path is formed when the open end of the passage member A2 is closed and at the same time the passage members D2, D3(A1) are placed in communication with each other under the control function of the three-way valve 105, and when the mechanical pump MP (internal combustion engine 20) is in operation and at the same time the electric pump EP is out of operation. In this case, cooling water circulates in the second circulation passage B (internal combustion engine 20), and in addition, cooling water circulates in the third circulation passage C (radiator 101) based on the function of the well-known thermostat (not illustrated) arranged on the second circulation passage B. Also, cooling water is caused to travel due to the driving force of the mechanical pump MP in the following order: passage member A4→thermal storage tank 100→passage member A3→electric pump EP→three-way valve 105→passage member A1(D3). As a result, the cooling water (hot water), being warmed by the heat generated in accordance with the operation of the internal combustion engine 20, is collected or recovered into the thermal storage tank 100.

The flow path shown in FIG. 3C is to supply the hot water reserved or stored in the thermal storage tank 100 to the internal combustion engine 20 when the internal combustion engine 20 is stopped. This flow path is formed when the open end of the passage member D2 is closed and at the same time the passage members A1(D3), A2 are placed in communication with each other under the control function of the three-way valve 105, and when the electric pump EP is in operation and at the same time the mechanical pump MP (internal combustion engine 20) is out of operation. In this case, cooling water is caused to travel due to the driving force of the electric pump EP in the following order: passage member A1(D3)→three-way valve 105→electric pump EP→passage member A3→thermal storage tank 100→passage member A4. As a result, the hot water reserved or stored in the thermal storage tank 100 is supplied to the internal combustion engine 20.

When the temperature in the cylinder head 20a is below the predetermined value at the time of engine starting for example, it is difficult for the fuel supplied for engine combustion to vaporize, thus bringing about the deterioration of the combustion state and/or the deterioration of exhaust characteristics. In such a case, the ECU 90 forms, as the warm-up processing of the internal combustion engine 20, a flow path or channel shown in FIG. 3C through the operations of the three-way valve 105 and the electric pump EP, so that hot water is controlled to be supplied from the thermal storage tank 100 to the internal combustion engine 20 to warm the inner walls of the intake ports and the like (hereinafter simply called as hot water supply operation). By performing the hot water supply operation, the combustion state and exhaust characteristics in each of the cylinders of the internal combustion engine 20 can be improved.

[Variation in Temperature between the Cylinder Intake Port Inner Walls]

First of all, as the hot water supply operation is carried out, the hot water stored in the thermal storage tank 100 flows into the cylinder head 20a of the internal combustion engine 20 through the passage member A4. The hot water having flowed into the cylinder head 20a sequentially passes along the neighborhoods of the intake ports PA, PB, PC, PD to warm the inner walls of the respective intake ports. Here, note that the temperature of the hot water falls gradually as it moves in the cylinder head 20a, so the warming or temperature rise effect (e.g., temperature rise speed) of the intake port inner walls due to the hot water varies depending upon the respective intake ports (cylinders).

Figure 4:
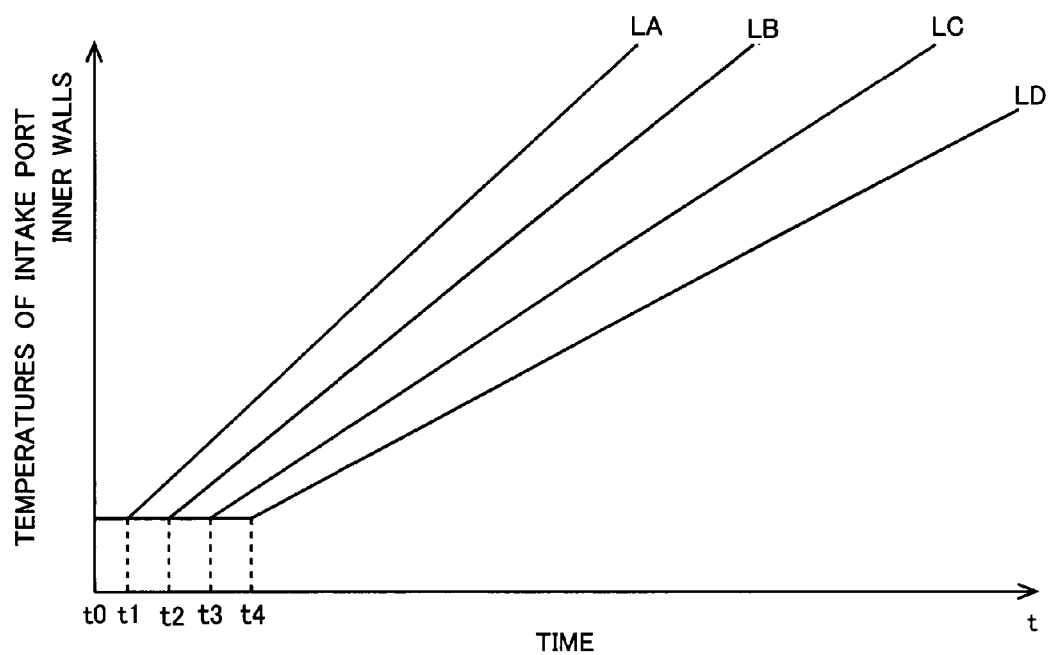
FIG. 4 is a timing chart showing changes in temperature of intake port inner walls due to the supply of hot water according to this embodiment.

FIG. 4 is a timing chart that illustrates temperature changes in the intake port inner walls in accordance with the hot water supply operation in this embodiment. In this figure, lines LA, LB, LC and LD indicate temperature changes in the inner walls of the intake ports PA, PB, PC and PD, respectively, and time point to represents the start time of the hot water supply operation. As shown in FIG. 4, in any of the intake ports, their inner wall temperature begins to rise after a predetermined time has elapsed after the start of the hot water supply operation, but the time point, at which the inner wall temperature begins to rise, and the temperature rise speed thereof vary in accordance with the respective intake ports. For example, the one whose inner wall temperature begins to rise at the earliest time point (t1) and whose temperature rise speed is the fastest is the intake port PA that is located at the most upstream side of the hot water flow path, whereas the one whose inner wall temperature begins to rise at the latest time point (t4) and whose temperature rise speed is the slowest is the intake port PD that is located at the most downstream side of the hot water flow path. In other words, the more downstream of the hot water flow path the intake ports locate, the later does their inner wall temperature rise start time become, and hence the lower does their temperature rise speed become. In addition, owing to such differences in their temperature rise start times and in their temperature rise speeds, the inner wall temperatures of the intake ports PA, PB, PC, PD vary with respect to one another at an arbitrary point in time. Such a variation in the inner wall temperatures tends to increase with the passage of time due to the difference in their temperature rise speeds.

As the temperatures of the intake port inner walls rise, the fuel supplied through injection into the intake ports become easier to vaporize (or atomize), so the stability of the combustion states in the cylinders can be basically improved. However, when the temperatures of the intake port inner walls are different from one another between the plurality of intake ports, the combustion states in the respective cylinders also come to differ from one another, as a result of which the driveability and the exhaust characteristics of the internal combustion engine 20 as a whole might be deteriorated.

[Influence of the Initial Values of the Intake Port Inner Wall Temperatures]

Next, reference will be made to the influence that the initial values of the intake port inner wall temperatures exert on the variation in the engine combustion states between the cylinders.

Now, let us consider the case where the supply of hot water is performed according to the following procedure.

(1) A predetermined target value TTRG (e.g., 40° C.) is set for the inner wall temperature of the intake port PD located on the most downstream side of the hot water flow path.

(2) Next, the supply of hot water is continued until the inner wall temperature of the intake port PD reaches the target value TTRG before the starting of the internal combustion engine 20.

(3) When the inner wall temperature of the intake port PD reaches the target value TTRG, the supply of hot water is stopped and the internal combustion engine 20 is started.

Figure 5A:
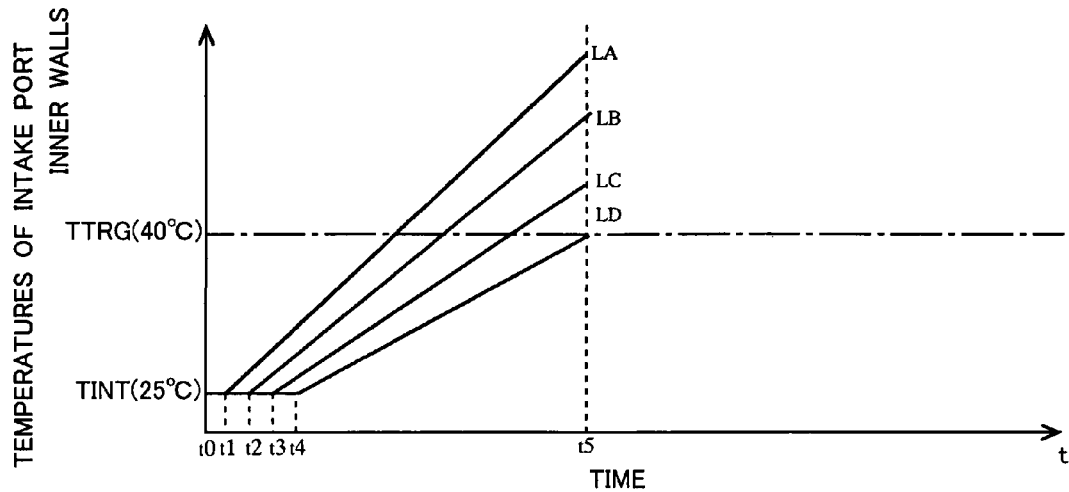
FIGS. 5A and 5B are timing charts showing, on the same time axis, changes in temperature of the inner walls of four intake ports observed during the time when the hot water supply is being performed according to this embodiment.
Figure 5B:
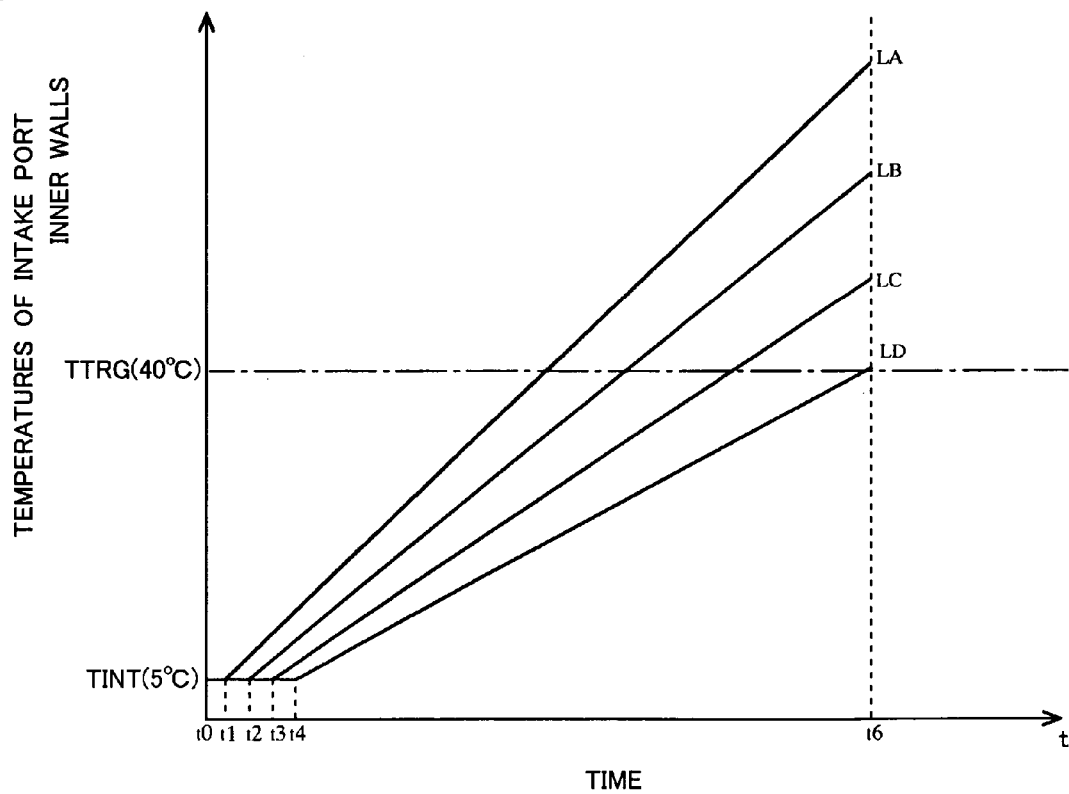

FIG. 5A shows the changes of the inner wall temperatures of the intake ports PA, PB, PC, PD, which are located in this order from the most upstream side to the most downstream side of the hot water flow path, from the initial value TINT of 25° C. to the predetermined target value TTRG (40° C.) of the inner wall temperature of the intake port PD. Also, FIG. 5B shows the changes of the inner wall temperatures of the intake ports PA, PB, PC, PD from the initial value TINT of 5° C. to the predetermined target value TTRG (40° C.) of the inner wall temperature of the intake port PD. Here, note that both of FIG. 5A and FIG. 5B have the same time base (axis of abscissa), and lines LA, LB, LC, LD in FIG. 5A and FIG. 5B indicate the changes of the inner wall temperatures of the intake ports PA, PB, PC, PD, respectively.

As can be seen from a comparison between FIG. 5A and FIG. 5B, the lower the initial value TINT, the variation in the inner wall temperatures between the four intake ports when the inner wall temperature of the intake port PD has reached the target value TTRG becomes the greater even if the target value TTRG is the same for the four intake ports. This is because the greater the difference between the target value TTRG and the initial value TINT, the longer does the operation time (duration time) of the water supply become, and because the longer the duration time of the hot water supply, the greater does the variation in the inner wall temperatures between the four intake ports at the end of the hot water supply become. As the variation in the inner wall temperatures between the four intake ports increases, the combustion states in the respective cylinders become different from one another. In other words, for example, in cases where the supply of hot water is performed with the target value TTRG being decided for advantages to all the cylinders from the viewpoint of easiness in the vaporization of fuel supplied through injection, the smaller the initial value TINT, the greater does the variation in the inner wall temperatures between the four intake ports become, so the combustion states in the respective cylinders come to differ from each other. As a result, at the starting of the internal combustion engine 20, the driveability and exhaust characteristics of the internal combustion engine 20 as a whole become liable to deteriorate, thus giving rise to a fear that the advantageous effect of the hot water supply might be reduced by half or to a substantial extent.

[General Outline of the Hot Water Supply Performed in this Embodiment]

The engine system 1 of this embodiment adopts a control structure that, upon the supply of hot water being performed, can effectively improve the driveability and the exhaust characteristics of the internal combustion engine 20 at engine starting even if the initial condition of the temperature of the internal combustion engine 20 may vary. In the following, reference will be made to the details of the hot water supply operation according to this embodiment.

When the supply of hot water is carried out, the engine system 1 variably sets a parameter (hereinafter referred to as a temperature target value TTRGY), which corresponds to the target value TTRG of the inner wall temperature of the intake port PD, in accordance with a parameter (hereinafter referred to as a temperature initial value TINTX) that corresponds to the initial value TINT of the inner wall temperature of the intake port PD.

Figure 6:
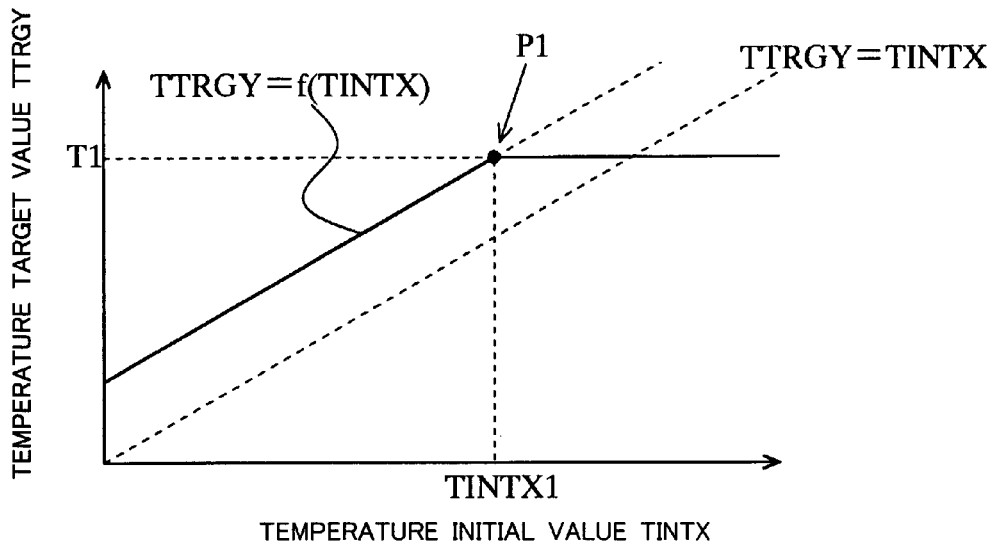
FIG. 6 is a graph showing one example of the relation between a temperature initial value and a temperature target value according to this embodiment.

FIG. 6 is a graph showing one example of the relation between the temperature initial value TINTX and the temperature target value TTRGY in this embodiment. In FIG. 6, a predetermined value T1 corresponds to the temperature target value TTRGY that is estimated to be able to perform the most efficient hot water supply operation in consideration of the easiness in vaporization of the fuel supplied through injection to the intake ports from fuel injection valves, the amount of consumption of the energy used for the hot water supply (e.g., the amount of electric power consumed by the electric pump EP), and the volume of the thermal storage tank 100. For instance, the predetermined value T1 can be set to 40° C. or so though depending upon the hardware characteristics of the engine system 1. Also, the relation between both the parameters TTRGY and TINTX in which the temperature target value TTRGY is a linear function of the temperature initial value TINTX is set based on the principle that the variation in the combustion states between the cylinders at the end of the hot water supply operation can be suppressed by setting these parameters in such a manner that the lower the temperature initial value TINTX, the lower the temperature target value TTRGY is set.

The engine system 1 of this embodiment performs the hot water supply operation by adopting, as the temperature target value TTRGY, a linear function f(TINTX) in the range of "TINTX<TINT1", and a predetermined value T1 in the range of "TINTX≧TINT1", with the temperature initial value TINTX corresponding to an intersection P1 between a straight line "TTRGY=f(TINTX)" and a straight line "TTRGY=T1" being made as a boundary. Stated in another way, when the temperature of the internal combustion engine 20 reaches the temperature target value TTRGY after the start of the hot water supply, the supply of hot water is ended (i.e., the electric pump EP is stopped) regardless of whether or not the internal combustion engine 20 is started.

As a result, it is possible to suppress the variation in the combustion states between the cylinders at the end of the water supply operation, in other words, at the starting of the internal combustion engine 20.

Figure 7:
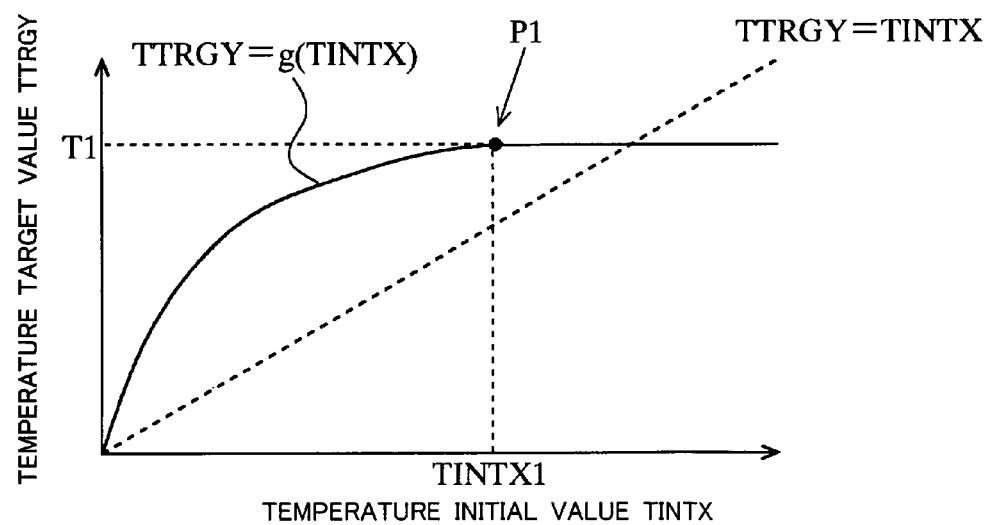
FIG. 7 is a graph showing another example of the relation between a temperature initial value and a temperature target value according to this embodiment.

Here, note that in the range where the lower the temperature initial value TINTX, the lower the temperature target value TTRGY is set, a nonlinear function g(TINTX) may be employed in place of the linear function f(TINTX) (see FIG. 7), or the data set (stored) beforehand may be adopted as the value corresponding to the temperature initial value TINTX.

In short, it is desirable to decide the relation between the temperature initial value TINTX and the temperature target value TTRGY so as to facilitate vaporization of the fuel in the intake ports in an effective manner through the continued supply of hot water, while suppressing an increase in the variation of the inner wall temperatures between the four intake ports due to the continued hot water supply.

[Concrete Procedure of Hot Water Supply Control]

Hereinafter, reference will be made to a concrete control procedure for performing the hot water supply operation according to this embodiment while referring to a flow chart in FIG. 8.

Figure 8:
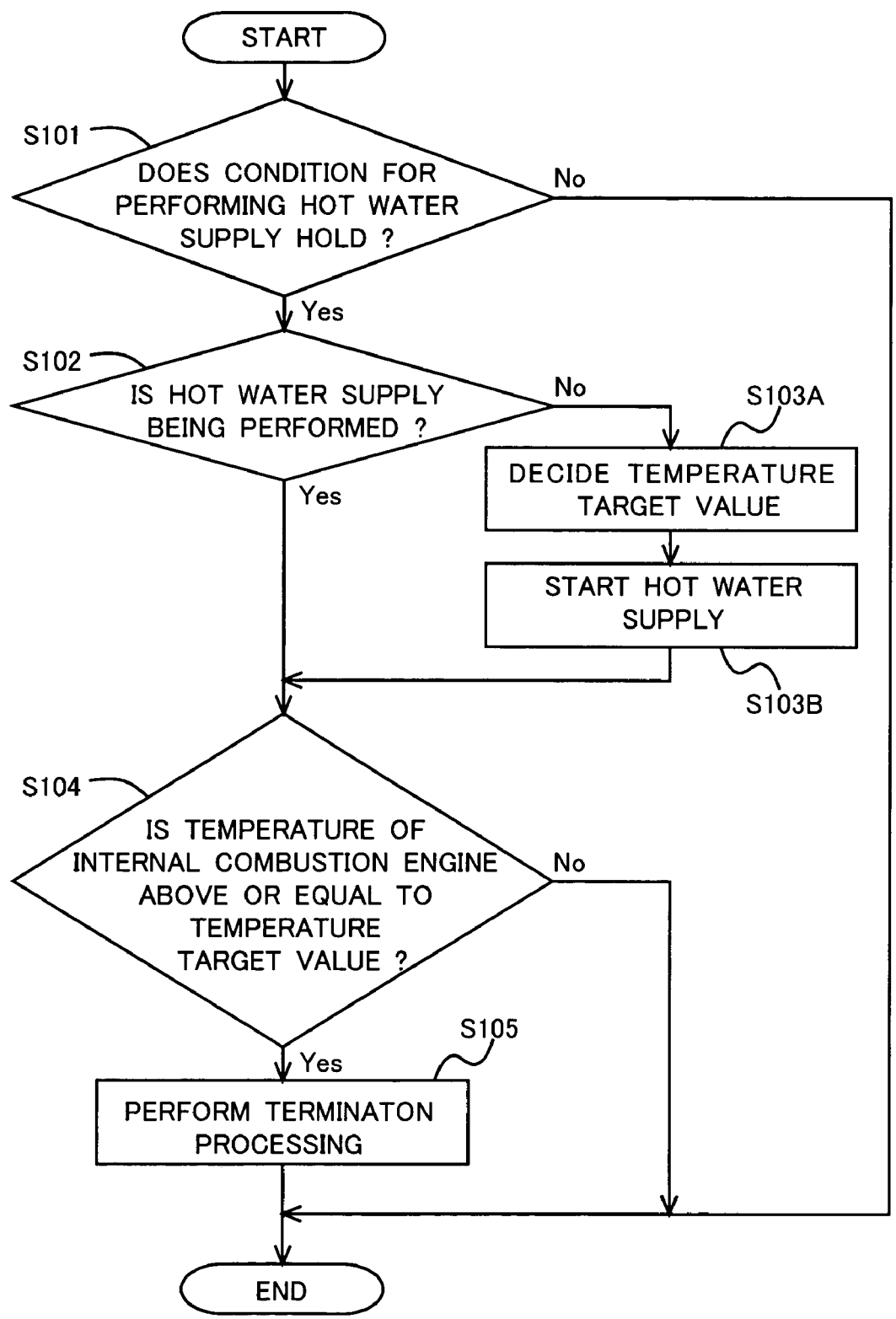
FIG. 8 is a control routine to perform the hot water supply (warm-up processing) according to this embodiment.

FIG. 8 illustrates a control routine for performing the hot water supply operation (warm-up processing) according to this embodiment. This routine is periodically executed by the ECU 90 during the operation of the engine system 1. When the processing shifts to this routine, first in step S101, the ECU 90 determines whether a starting condition for the hot water supply holds. Specifically, it is determined that when the following two conditions are satisfied, the condition or requirement for starting the hot water supply operation (i.e., starting condition) holds: (1) the door at the driver's seat side of a vehicle having the engine system 1 installed thereon is open; and (2) the voltage of the battery 80 (i.e., the amount of charged or accumulated electricity) exceeds a predetermined value. When the starting condition for the hot water supply does not hold, the ECU 90 exits this routine without doing any particular processing, whereas when the starting condition for the hot water supply holds, the ECU 90 makes a determination as to whether the hot water supply operation is being performed (step S102).

<Starting of the Hot Water Supply>

A negative determination in step S102 means that the condition for performing the hot water supply holds, and that the hot water supply is now not being performed. In this case, the ECU 90 decides (sets) the temperature target value TTRGY based on the current temperature (temperature initial value) TINTX (see line 220 in FIG. 9) by making use of a function (see FIG. 6 and FIG. 7) set beforehand (S103A), and starts the hot water supply (S103B, see line 230 in FIG. 9). Here, note that a "target value setting device 901" according to the present invention is constituted, in this embodiment, by a part of the ECU 90 that performs the processing of step S103A.

<End of the Hot Water Supply>

On the other hand, when the determination in step S102 is affirmative (i.e., when the hot water supply is being performed), the ECU 90 determines whether the temperature of the internal combustion engine 20 has reached the temperature target value TTRGY, and when the temperature of the internal combustion engine 20 has not yet reached the temperature target value TTRGY, the ECU 90 exits this routine without doing any particular processing. In this case, the hot water supply is continued. On the other hand, when the temperature of the internal combustion engine 20 is higher than or equal to the temperature target value TTRGY, the ECU 90 performs the processing of terminating the hot water supply (i.e., stops the electric pump EP and operates the three-way valve 105 to place the flow path of the cooling water into the operating state shown in FIG. 3A), and then exits this routine.

As described above, according to the engine system 1 of this embodiment, even if the initial condition of the temperature of the internal combustion engine 20 varies upon execution of the hot water supply control (in particular, even if the initial temperature concerned is relatively low), it is possible to suppress an increase in the variation of the inner wall temperatures of the intake ports between the cylinders at the starting of the internal combustion engine. The variation of the inner wall temperatures of the intake ports between the cylinders is essentially caused due to the progress of a nonuniform temperature distribution in the interior of the internal combustion engine 20 in accordance with the hot water supply. Such a nonuniform temperature distribution in the engine interior takes place not only in multi-cylinder internal combustion engines but also in single-cylinder internal combustion engines. Accordingly, even if the present invention is applied to an engine system that is equipped with an internal combustion engine comprising a single cylinder, there can also be achieved advantageous effects similar to those obtained in this embodiment.

In addition, the following advantageous effects can be achieved by adopting the control structure according to this embodiment. That is, when the temperature target value TTRGY is fixed, the lower the temperature initial value TINTX, the longer does the duration time of the hot water supply become, so the amount of hot water required and the amount of electric power consumed by the electric pump EP increase, as a consequence of which negative effects of the hot water supply, such as one represented by an increase in the power consumption of the electric pump EP, become larger. On the other hand, the longer the duration time of the hot water supply, the greater does the amount of hot water supplied to the internal combustion engine 20 become, so positive effects of the hot water supply, such as one represented by facilitated vaporization of the fuel supplied to the internal combustion engine 20, become larger. But, the longer the duration time of the hot water supply, the greater the negative effects becomes than the positive effects. In this case, however, according to this embodiment, it is possible to prevent the positive effects of the hot water supply, such as one represented by facilitated vaporization of the fuel supplied to the internal combustion engine 20, from being substantially reduced by the negative effects of the hot water supply, such as one represented by the increase in the power consumption of the electric pump EP.

Here, note that a variety of pieces of information on temperature can be utilized as "the temperature of the internal combustion engine 20" used for the control structure of this embodiment. For example, either of the average temperature of the inner walls of the intake ports PA, PB, PC, PD, the average temperature of the cylinders SA, SB, SC, SD, the average temperature of the entire cylinder head 20a, and the average temperature of the entire internal combustion engine 20 can be utilized as the temperature of the internal combustion engine 20. Also, the temperature of a specific intake port, the temperature of a specific cylinder, or the temperature of another specific part of the internal combustion engine 20 may be employed for this purpose.

Further, these parameters may be estimated based, for example, on the detection signal of the water temperature sensor 104a. Alternatively, a temperature sensor may be installed at a specific part of the internal combustion engine 20, so that the above parameters can be detected or estimated based on a detection signal of such a temperature sensor. Furthermore, it is also possible to estimate them based on the operating condition of the internal combustion engine 20 (e.g., engine load, the number of revolutions per minute of the engine, etc.). Here, note that "a temperature information acquisition device 903" in the present invention comprises the water temperature sensor 104a or the like in this embodiment.

However, when the internal combustion engine 20 is out of operation, a temperature change might be generated locally in the interior of the internal combustion engine 20 for instance. Therefore, there may be a case where the history or record of the temperature of the internal combustion engine 20 grasped or detected previously in the last or preceding engine operation is more reliable as a parameter reflecting the temperature of the entire internal combustion engine 20 than the output of a temperature sensor arranged at a specific part of the internal combustion engine 20. Accordingly, the temperature of the internal combustion engine 20 used in the current hot water supply may be estimated based on the history or record of a signal detected or a value estimated at the last engine operation, at the engine starting, etc. Such a technique of estimating the temperature of the internal combustion engine 20, which is to be employed in the current hot water supply, based on the history or record of the temperature of the internal combustion engine 20 grasped or detected previously can be adopted as an effective means in the hybrid engine system 1 in which the internal combustion engine 20 relatively frequently repeats start and stop motions.

Further, an initial value of the temperature of an external part (e.g., external air temperature) outside of the internal combustion engine 20 can be adopted in place of the temperature initial value TINTX of the internal combustion engine 20.

Furthermore, a control structure for setting the amount of the heat to be supplied from the thermal storage tank 100 to the internal combustion engine 20 may be adopted in place of the control structure for setting the temperature target value TTRGY based on the temperature initial value TINTX. The amount of the heat to be supplied to the internal combustion engine 20 is estimated based, for example, on the temperature of the hot water stored or accumulated in the thermal storage tank 100, the duration time of the heat supply, and the volumetric flow rate of the hot water flowing into the cylinder head 20a of the internal combustion engine 20 through the passage member A4 during the heat supply operation. That is, "a heat supply amount setting device 902" in the present invention is constituted by a part of the ECU 90 in this embodiment, which serves to set the amount of heat supplied from the thermal storage tank 100 to the internal combustion engine 20.

In addition, although in the above-mentioned embodiment, the present invention has been applied to a vehicle-mounted hybrid engine system, it is not limited to this but is applicable to an engine system that is equipped with an internal combustion engine alone as its drive source.

Moreover, the present invention can be applied to not only engine systems equipped with the internal combustion engine 20 of the type in which fuel is supplied through injection to intake ports, but also those with an internal combustion engine of the type in which fuel is directly supplied through injection to combustion chambers.

Further, the present invention can also be applied to engine systems that serve to drive a variety of movable objects other than vehicles.

While the invention has been described in terms of a preferred embodiment, those skilled in the art will recognize that the invention can be practiced with modifications within the spirit and scope of the appended claims.

What is claimed is:

1. An engine system with a thermal storage device which is equipped with an internal combustion engine and said thermal storage device for storing heat, and which serves to supply the heat stored in said thermal storage device to said internal combustion engine through a prescribed thermal medium so as to raise the temperature of said internal combustion engine to a prescribed target value, said engine system comprising:
a temperature information acquisition device that acquires information on the temperature of said internal combustion engine at the time of said heat supply; and
a target value setting device that sets said target value based on said acquired information in such a manner that the lower the temperature of said internal combustion engine, the smaller said target value becomes.

2. The engine system with a thermal storage device as set forth in claim 1, wherein when the temperature of said internal combustion engine at the time of said heat supply is below a predetermined value, said target value setting device sets said target value in such a manner that the lower the temperature of said internal combustion engine, the smaller said target value becomes.

3. An engine system with a thermal storage device which is equipped with an internal combustion engine and said thermal storage device for storing heat, and which serves to supply the heat stored in said thermal storage device to said internal combustion engine through a prescribed thermal medium thereby to perform engine warm-up processing, said engine system comprising:
a temperature information acquisition device that acquires information on the temperature of said internal combustion engine at the time of said heat supply; and
a heat supply amount setting device that sets an amount of heat supplied to said internal combustion engine based on said acquired information in such a manner that the lower the temperature of said internal combustion engine, the smaller the amount of heat supplied to said internal combustion engine becomes.

4. The engine system with a thermal storage device as set forth in claim 3, wherein said engine system performs the supply of heat to said internal combustion engine so as to make the temperature of said internal combustion engine become a prescribed target value, and said heat supply amount setting device sets a time for which said supply of heat is performed in such a manner that the lower the temperature of said internal combustion engine, the shorter said time becomes.

5. The engine system with a thermal storage device as set forth in claim 3, wherein when the temperature of said internal combustion engine at the time of said heat supply is below a predetermined value, said heat supply amount setting device sets the amount of heat supplied to said internal combustion engine in such a manner that the lower the temperature of said internal combustion engine, the smaller the amount of heat supplied to said internal combustion engine becomes.

6. The engine system with a thermal storage device as set forth in claim 4, wherein when the temperature of said internal combustion engine at the time of said heat supply is below a predetermined value, said heat supply amount setting device sets a time for which said supply of heat is performed in such a manner that the lower the temperature of said internal combustion engine, the shorter said time becomes.

7. The engine system with a thermal storage device as set forth in claim 1, wherein the information acquired by said temperature information acquisition device at the time of said heat supply contains at least one of the temperature of an outside air and the temperature of engine cooling water.

8. The engine system with a thermal storage device as set forth in claim 3, wherein the information acquired by said temperature information acquisition device at the time of said heat supply contains at least one of the temperature of an outside air and the temperature of engine cooling water.

9. The engine system with a thermal storage device as set forth in claim 1, wherein the temperature of said internal combustion engine is decided by at least one of the temperature of engine cooling water, the temperature of an intake port inner wall, and the temperature of a cylinder inner wall that constitutes said internal combustion engine.

10. The engine system with a thermal storage device as set forth in claim 3, wherein the temperature of said internal combustion engine is decided by at least one of the temperature of engine cooling water, the temperature of an intake port inner wall, and the temperature of a cylinder inner wall that constitutes said internal combustion engine.

11. The engine system with a thermal storage device as set forth in claim 7, wherein the temperature of said internal combustion engine is decided by at least one of the temperature of engine cooling water, the temperature of an intake port inner wall, and the temperature of a cylinder inner wall that constitutes said internal combustion engine.

12. The engine system with a thermal storage device as set forth in claim 8, wherein the temperature of said internal combustion engine is decided by at least one of the temperature of engine cooling water, the temperature of an intake port inner wall, and the temperature of a cylinder inner wall that constitutes said internal combustion engine.

13. An engine temperature raising method comprising:
a first step of acquiring information on the temperature of an internal combustion engine at the time when heat is supplied from a thermal storage device to said internal combustion engine, and setting a target value of the temperature of said internal combustion engine such that the lower the temperature of said internal combustion engine obtained from said acquired information, the smaller the target value of the temperature of said internal combustion engine becomes; and
a second step of supplying the heat stored in said thermal storage device to said internal combustion engine through a prescribed thermal medium so as to raise the temperature of said internal combustion engine to said target value.

14. The engine temperature raising method as set forth in claim 13, wherein in said first step, when the temperature of said internal combustion engine obtained from said acquired information is below a predetermined value, the target value of the temperature of said internal combustion engine is set such that the lower the temperature of said internal combustion engine, the smaller the target value of the temperature of said internal combustion engine becomes.

* * * * *